United States Patent [19]
Kroon

[11] Patent Number: 5,957,593
[45] Date of Patent: Sep. 28, 1999

[54] HALFTONE PATTERN GEOMETRY FOR PRINTING HIGH QUALITY IMAGES

[75] Inventor: Stephen M. Kroon, Lake Oswego, Oreg.

[73] Assignee: Tektronix, Inc., Wilsonville, Oreg.

[21] Appl. No.: 08/979,485

[22] Filed: Nov. 28, 1997

Related U.S. Application Data

[63] Continuation of application No. 08/526,397, Sep. 11, 1995, abandoned, which is a continuation of application No. 08/152,630, Nov. 12, 1993, abandoned.

[51] Int. Cl.$^6$ ..................................................... B41J 2/36
[52] U.S. Cl. ............................... 400/120.07; 400/120.09
[58] Field of Search .................................. 358/296, 298; 395/109; 400/120, 120.07, 120.09; 346/76 A

[56] References Cited

U.S. PATENT DOCUMENTS

| | | | |
|---|---|---|---|
| 4,689,694 | 8/1987 | Yoshida | 358/298 |
| 4,750,010 | 6/1988 | Ayers et al. | 346/107 |
| 4,752,822 | 6/1988 | Kawamura | 358/80 |
| 4,814,886 | 3/1989 | Kuge | 358/298 |
| 5,075,780 | 12/1991 | Shibahara | 358/298 |
| 5,221,971 | 6/1993 | Allen | 358/298 |
| 5,325,160 | 6/1994 | Imakawa | 358/298 |
| 5,588,094 | 12/1996 | Kroon | 395/109 |

FOREIGN PATENT DOCUMENTS

| | | |
|---|---|---|
| 2174265 | 10/1986 | United Kingdom . |
| 2264024 | 8/1993 | United Kingdom . |

OTHER PUBLICATIONS

Stoffel, J. C. and Moreland, J. F., "A Survey of Electronic Techniques For Pictorial Image Reproduction," *IEEE Transactions On Communications*, vol. Com–29, No. 12, Dec. 1981, pp. 1898–1925.

Ulichney, Robert, *Digital Halftoning*, 1987, pp. 1–11, 77–98, 110–139, 187–208, 343, and 344.

*Primary Examiner*—John Hilten
*Attorney, Agent, or Firm*—Ralph D'Alessandro; Paul S. Angello

[57] ABSTRACT

A digital halftone pattern geometry adapted not to the characteristics of variable dot size printing presses but to the operating characteristics of the printer itself achieves a high degree of image quality. The techniques for creating the halftone pattern geometry include linear spot growth to provide uniform darkening and the use of a super-cell structure to maximize the number of tint or gray scale levels. A preferred super-cell structure is of hexagonal dispersed-dot form to reduce low frequency artifacts by spreading them over a greater number of frequencies. Hexagonal centered super-cells also distribute row and column artifacts along three axes of symmetry instead of two. The super-cell structure gives sharp edges and a greater amount of edge area available to manipulate when the super-cells are tessellated to form an image. This halftone cell arrangement is especially suited to thermal transfer printers, which print linear rows and form good rectangular shapes. The resulting image exhibits smooth darkening even for cells having few pixels.

10 Claims, 11 Drawing Sheets

HALFTONE PATTERN GEOMETRY FOR PRINTING HIGH QUALITY IMAGES

This is a continuation of application Ser. No. 08/526,397 filed Sep. 11, 1995 which was a continuation of application Ser. No. 08/152,630 filed Nov. 12, 1993 both now abandoned.

TECHNICAL FIELD

This invention relates to digital image printing (e.g., thermal transfer, phase-change (hot melt) ink jet, and laser xerography) and, in particular, to methods and apparatus for implementing digital ordered dithering for halftoning to preserve detail in output images produced by low resolution printers.

BACKGROUND OF THE INVENTION

The following background information is presented only by way of example with reference to thermal transfer printing. Thermal transfer printing entails the controlled transfer of an ink (e.g., a colorant dispersed in a wax base material) from a carrier such as a polymer ribbon onto a print medium surface. A thermal transfer printer having a print head with a large number of independently activable heating elements per unit of length is one prior art apparatus employed for this purpose. The ink/carrier structure is placed within the printer such that the carrier side is adjacent the heating elements and the ink side is adjacent a print media support upon which the print medium rests during printing.

To print an image, the print head contacts the polymer ribbon and ink is transferred to particular locations on the print medium surface when predetermined combinations of heating elements are activated adjacent the image-forming locations. The ink/carrier structure is locally heated by the heating elements to a temperature at or above the melting point of the ink. In this manner, an amount of ink softens and adheres to the print medium at the predetermined locations to form the image.

Color images are printed with an ink/carrier structure that includes separate regions of differently colored inks such as the subtractive primary colors, yellow, magenta, and cyan. Color printing is accomplished by sequential passes of the print medium past the print head, each pass selectively transferring different colored inks at predetermined times. Thermal printing ribbons are available with a single black panel, three color panels (yellow, magenta, and cyan), or four color panels, (yellow, magenta, cyan, and black).

Many printers include a control software driver program (hereafter "printer driver") for handling various aspects of the printer operation. Such printer drivers are often interfaced to a computer programming language known as PostScript®, which is available from Adobe Systems Inc., Mountain View, Calif. The PostScript® language, described in the PostScript® Language Reference Manual, Second Edition, 1990, Addison-Wesley Publishing Co., Reading, Mass., includes methods for manipulating text and graphics, selecting media sizes, types, trays, and the number of copies to be printed.

A thermal transfer printer typically transfers quantities of ink of a single volume that produce on a print medium dots of ink sized to provide "solid fill" printing at a given resolution, such as 300 dots per inch ("dpi") 12 dots per millimeter ("dpm"). Single dot size printing is acceptable for most test and graphics printing applications not requiring "photographic"image quality. Photographic image quality normally requires a combination of high dot-resolution and an ability to modulate a reflectance (i.e., gray scale) of dots forming the image.

In single dot size printing, average reflectance of a region of an image is typically modulated by a process referred to as "dithering" in which the perceived intensity of an array of dots is modulated by selectively printing the array at a predetermined dot density. For example, if a 50 percent local average reflectance is desired, half of the dots in the array are printed.

An image is formed by the tessellation of multiple cells or "tiles," which are clusters of pixels arranged in a predetermined pattern. The pixels correspond to dots printed on a page. Each cell has the same number of pixel locations arranged in the same pattern. The number of pixels filled in a cell determines its darkness, and there is a specified "fill order" for darkening certain pixels in a cell as its darkness increases. The number of pixels selected for a cell presents a tradeoff between the resolution and number of available gray levels of the resulting image. A greater number of pixels reduces image resolution but increases the number of available gray levels. Replication of tessellated cells of varying darknesses form the printed image.

An important characteristic of thermal wax printers is their inability to place individual dots independently of neighboring dots. This characteristic, which is shared by other common printing technologies, is complicated by a high sensitivity to the thermal history of the print head.

The lack of pixel independence imposes an ordering of clusters. Clustered-dot halftoning partitions the addressable area into a relatively low frequency tiling of the printed page, as compared with the resolution of the device. Each one of multiple pixel clusters is populated from the center out to simulate an oval spot of variable size of the sort printed (but at a much higher frequency than dots printed) on a printing press.

The tendency to simulate conventional printing methods is reinforced in PostScript® in which the primary, and originally the only, way to specify a digital halftone was with a screen angle, frequency, and spot fill function (normally a simple distance from center function) for each primary color. Working within the framework of the Post-script® halftone screen specification, several significant improvements have been implemented to improve the quality of thermal wax output on Postscript® compatible Tektronix printers. These improvements include a spiral spot (dot cluster) growth pattern to reduce unwanted cluster-to-cluster interactions; aligned halftone screens to avoid moire (rosette) patterns; and "super-cell" grouping of spots to increase tint levels while retaining high frequency detail.

FIG. 1 shows a prior art cell grouping of twenty-nine pixels arranged in a square pattern with pixel attached to each vertex of the square as shown. The numbers identifying each pixel in FIG. 1 represent the order in which the pixels in the cell are darkened and indicate a spiral spot growth pattern starting from pixel 0 in the center and moving counter-clockwise around pixel 0 to pixels 25, 26, 27, and 28 at the vertices. FIG. 2 shows a prior art super-cell structure and spot growth visitation order for an array of nine halftone cells of the type shown in FIG. 1. FIG. 3 shows three super-cell structures of FIG. 2 arranged to define a prior art super-cell tessellation geometry. FIG. 4 shows an image halftoned using the screen corresponding to the tessellation geometry of FIG. 3.

The halftoning method depicted in FIGS. 1–4 was implemented on, for example, the Phaser PX, Phaser PXi, Phaser II PXi, and Phaser 200 printers manufactured by Tektronix, Inc., the assignee of this application. These printers had 300×300 dpi (12×12 dpm) addressability and exhibited good image quality because of the super-cell spiral spots.

The Phaser 200, a faster and less expensive thermal wax printer, presented certain new problems when used with the prior halftoning technique described above. The faster print speed set new limits on dot geometries that would produce consistent results. The relatively complex cell shapes used in the prior technique caused nonuniform darkness changes across tint levels. These were compensated for with gamma correction to produce an acceptable result, but at the cost of a significant reduction in the number of tint or gray scale levels.

In a subsequent Tektronix product, the Phaser 220, the addressability was increased to 600 dpi (24 dpm) in the direction of paper motion to increase printer resolution, but dot size remained the same. To take full advantage of increased resolution, a much higher frequency halftone pattern was needed. In addition, a new pattern would be needed to accommodate overlapping dots, an asymmetric grid, and the geometry limitations described above. Such needs cannot be met by the existing halftone method.

SUMMMARY OF THE INVENTION

An object of this invention is, therefore, to provide a halftone pattern geometry for producing high quality printer images.

Another object of this invention is to provide such a halftone pattern geometry with an adequate number of available tint or gray scale levels and uniform monotonic darkening properties.

A further object of this invention is to implement such a halftone pattern geometry in a thermal transfer printer.

Yet another object of the present invention is to implement such a halftone pattern geometry in a PostScript®-compatible printer.

The present invention achieves a higher degree of image quality by implementing digital halftoning techniques that are adapted not to the characteristics of variable dot size printing presses but to the operating characteristics of the printer itself. The techniques include linear spot growth to provide uniform darkening and the use of a super-cell structure to maximize the number of tint or gray scale levels. A preferred super-cell structure is of hexagonal dispersed-dot form to reduce low frequency artifacts by spreading them over a greater number of frequencies. Hexagonal centered super-cells also distribute row and column artifacts along three axes of symmetry instead of two.

In a preferred embodiment, the pixels in a single-pixel wide linear halftone cell grow in one direction. The fill order (i.e., darkening sequence of the pixels in the cell) is of importance to the extent that the printed spot appears connected (i.e., has no gaps) at every tint or gray scale level. The cells are clustered in a super-cell structure that provides a dispersed-dot ordered dither for a regular hexagonal grid containing nine elements. The super-cell structure is configured in the asymmetric hexagonal grid to provide perceptibly uniform darkening from asymmetric halftone cells. The "visitation order" of darkening selected pixels in a specified sequence of linear cells in the super-cell structure provides a nested dot growth pattern dither process. A preferred visitation order results in each cell being within one gray scale level of every other cell in the super-cell structure.

The super-cell structure gives sharp edges and a greater amount of edge area available to manipulate when the super-cells are tessellated to form an image. This halftone cell arrangement is especially suited to thermal transfer printers, which provide uniform separation between thin lines in the direction of paper motion. The resulting image exhibits smooth darkening, even for cells having few pixels. This is so because all levels of cell growth exhibit the same cell edge profile. With a one-pixel wide cell, more high frequency detail can be resolved and high frequency input images have a smaller distorting effect on the halftone cell structure. The use of a linear halftone cell makes possible uniform image darkening on grids with any addressability aspect ratio.

Additional objects and advantages of this invention will be apparent from the following detailed description of preferred embodiments thereof which proceeds with reference to the accompanying drawings.

BRIEF DESCRIPTION OF THE DRAWINGS

FIG. 8 shows a hexagonal super-cell structure of and a preferred spot growth visitation order for an array of nine halftone cells of the type shown in FIG. 6.

DETAILED DESCRIPTION OF PREFERRED EMBODIMENTS

Figure 5:
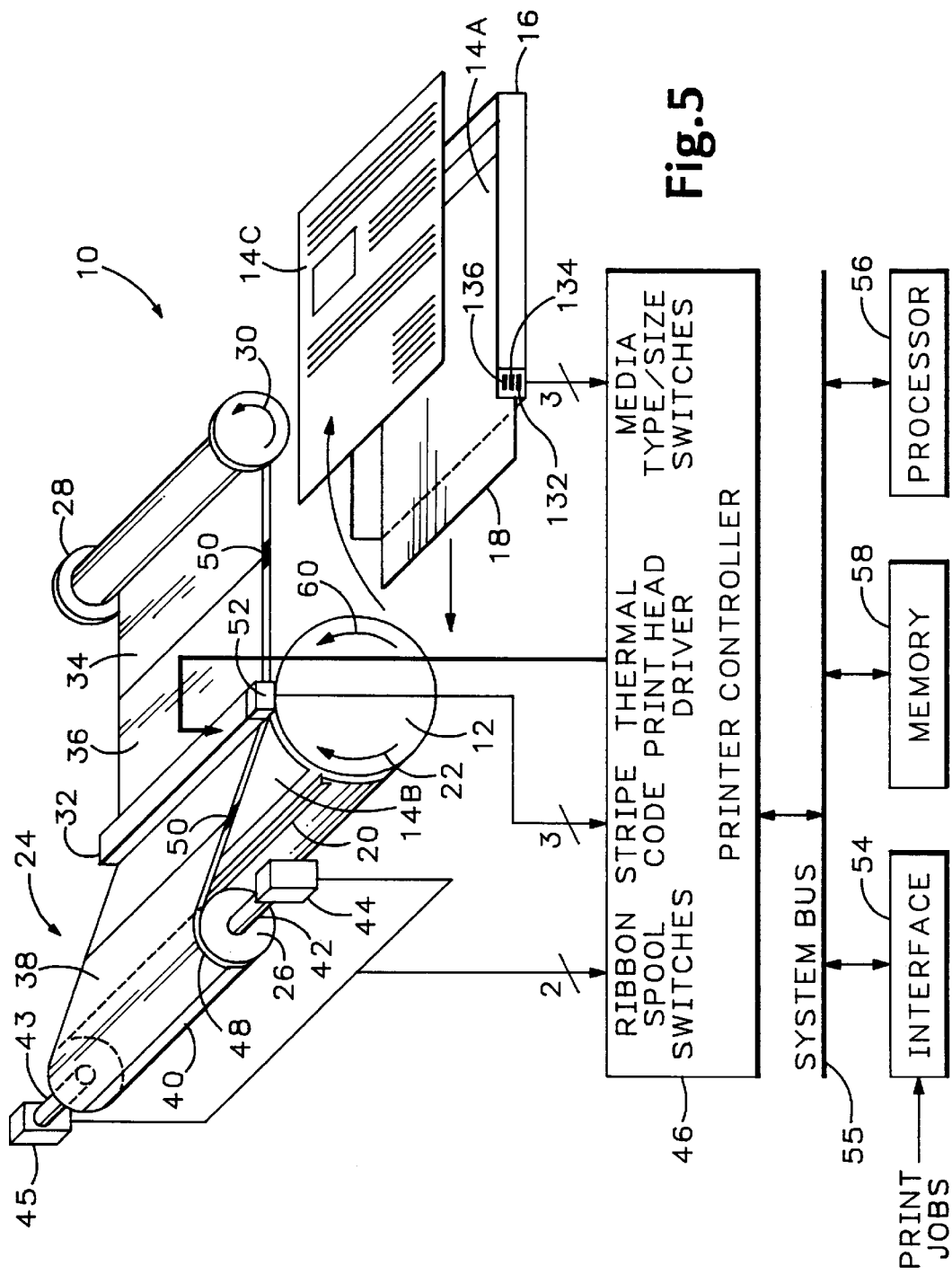
FIG. 5 is a functional schematic diagram showing the interrelationship among the electromechanical components of a thermal transfer printing system used in implementing the invention.

With reference to FIG. 5, a thermal transfer printing system 10 (hereafter "printer 10") includes a drum 12 upon which a print medium 14A is received from a media tray 16. (Print medium 14 is shown in printer 10 at three locations designated by a letter suffix, i.e., 14A, 14B, or 14C.) A leading edge 18 of print medium 14A is fed by conventional means to a medium clamp 20 that secures print medium 14B to drum 12, which then rotates in a direction indicated by arrow 22 to wrap print medium 14B around drum 12. Drum 12 is preferably of a diameter sufficient to hold extended-length A4-size media and is coated with rubber to enhance media-to-drum dimensional stability and thermal transferability of ink to print medium 14B.

Printer 10 also includes a thermal transfer ribbon 24 suspended between a supply spool 26 and a take-up spool 28. Take-up spool 28 is driven in a direction indicated by arrow 30 with a torque sufficient to feed ribbon 24 through a nip formed between drum 12 and a thermal print head 32 at a rate determined by the rotation of drum 12. Ribbon 24 preferably includes repeating sets of pre-coat 34, yellow 36, magenta 38, and cyan 40 panels. Many commercially available ribbons do not include pre-coat panels 34.

In operation, printer 10 receives a print job at a data communications interface 54. The print job is transferred to a system bus 55 that is in communication with a printer controller 46, a processor 56, and a memory 58. Processor 56 processes data and commands contained in the print job and transmits control and printing data to printer controller 46. Processor 56 executes the printer driver stored in memory 58, and exchanges data with a Postscript® interpreter.

After the print job is interpreted by processor 56 and stored as yellow, magenta, and cyan image data in memory 58, printer controller 46 causes print medium 14A to feed from media tray 16 to medium clamp 20 on drum 12. Medium clamp 20 is activated, and drum 12 is caused to rotate such that leading edge 18 of print medium 14B is just past the nip between drum 12 and thermal print head 32. Ribbon 24 is moved by take-up spool 28 until a coded marker 50 on ribbon 24 is detected by a photosensor array 52 that is mounted adjacent thermal print head 32, thereby indicating a pre-coat panel 34 is positioned under thermal print head 32.

Drum 12 is rotated one revolution and pre-coat panel 34 is moved through the nip while all the image data stored in memory 58 simultaneously drive thermal print head 32, thereby thermally transferring a pre-coat image to print medium 14B and advancing ribbon 24 such that yellow panel 36 is in the nip. Drum 12 is rotated a second revolution and yellow panel 36 is moved through the nip while the yellow image data stored in memory 58 simultaneously drive thermal print head 32, thereby thermally transferring a yellow image to print medium 14B and advancing ribbon 24 such that magenta panel 38 is in the nip. The sequence is repeated for the magenta and cyan image data until a full color image is transferred and registered on top of the pre-coat image on print medium 14B. Drum 12 reverses and rotates in the direction of an arrow 60, releases medium clamp 20, and feeds print medium 14C from printer 10 by means of a conventional exit path mechanism (not shown).

Figure 6:
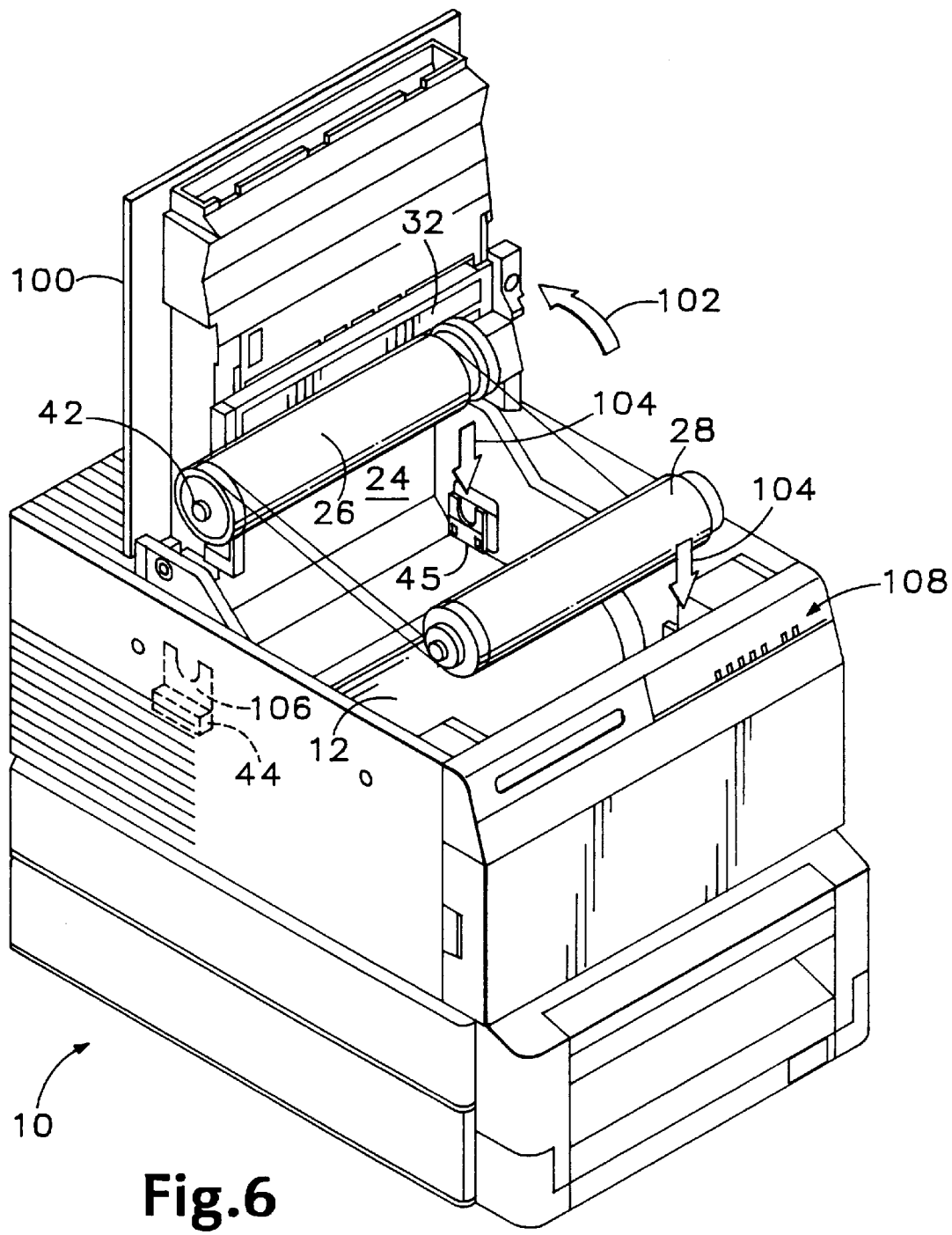
FIG. 6 is an isometric pictorial diagram of a thermal transfer printer of FIG. 4 showing a ribbon access door in an open position to expose major components of the printer.

FIG. 6 shows printer 10 with a ribbon access door 100 shown in an open position indicated by an arrow 102 to expose ribbon 24 in a position removed from printer 10. Ribbon 24 is installed by lowering supply spool 26 and take-up spool 28 into printer 10 in the direction of arrows 104. If ribbon 24 includes pre-coat panel 34, supply spool 26 will have an extended-length left hub 42 that activates a left hub microswitch 44 (shown in phantom) mounted adjacent a hub support 106 (shown in phantom). Also shown are drum 12, thermal print head 32, and a set of status indicators (shown generally as indicators 108).

A more complete description of the interpretation of the print job by processor 56 and its interaction with printer controller 46 to form a printed image follows with reference to FIGS. 7–10.

Figure 7:
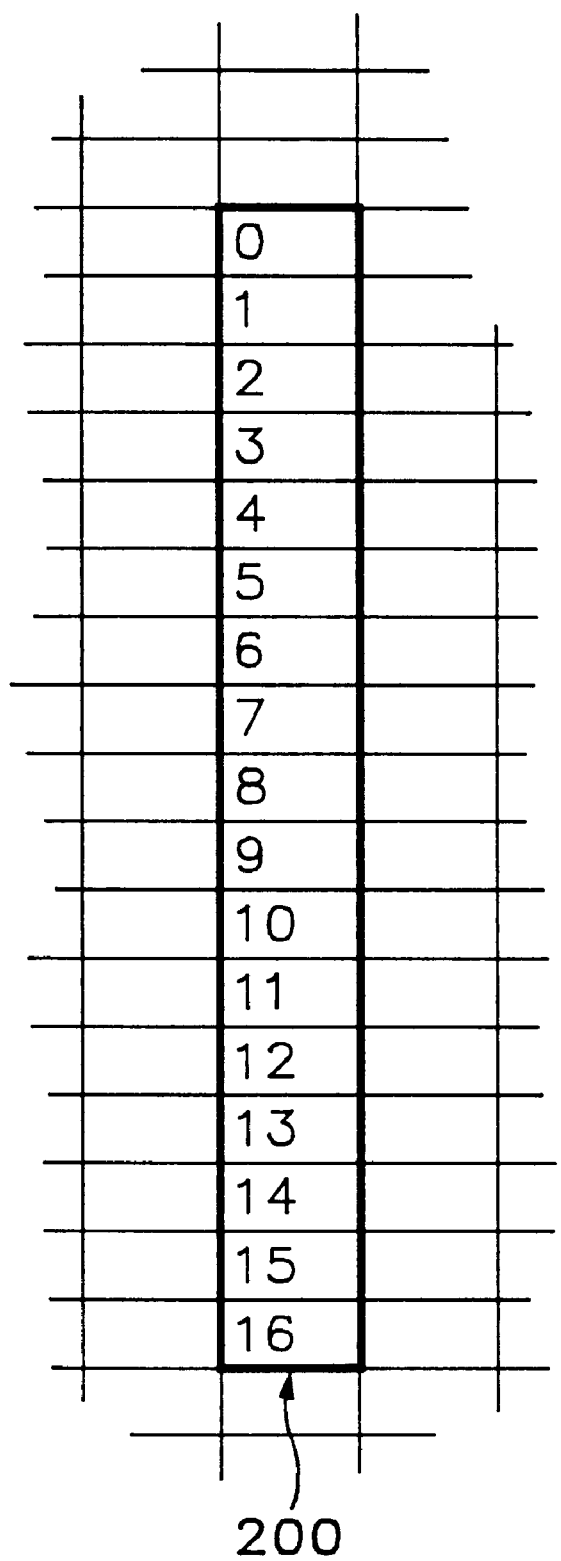
FIG. 7 shows a preferred linear halftone cell of the invention.

FIG. 7 shows a 1×N pixel halftone cell 200 used to create a halftone pattern geometry on a 300×600 dpi (12×24 dpm) grid in accordance with the invention. In one embodiment, cell 200 includes 17 pixels (i.e., N=17). In FIG. 7, each of the rectangular pixels is consecutively numbered from 0 to 16 to indicate spatially asymmetric spot growth as pixels are progressively darkened to achieve a perceived monotonic darkening of cell 200. Because it is one pixel wide, cell 200 is characterized by linear spot growth and has, therefore, a dominant length dimension.

The order of darkening the pixels to cause linear spot growth is called "spot fill order." A number of possible spot fill orders can achieve monotonic darkening. A first possible spot fill order is unidirectional darkening, which entails initially darkening a first terminal pixel, progressively darkening adjacent pixels, and finally darkening a second terminal pixel. This is the spot fill order shown in FIG. 7 with pixels 0 and 16 representing the terminal pixels. A second possible spot fill order is center-weighted, bidirectional darkening, which entails initially darkening a medial pixel of cell 200 and alternately darkening adjacent pixels on either side of the medial pixel outwardly toward two terminal pixels. For pixel growth from the center of cell 200, pixel 0 represents the center pixel and pixels 15 and 16 represent the terminal pixels. A third possible spot fill order is center-weighted, bidirectional, nonconsecutive darkening, which entails leaving a gap between adjacent pixels during the fill process. This spot fill order is otherwise similar to the second spot fill order. For comparison purposes, the diagrams below show from left to right the respective first, second, and third possible spot fill order examples described above.

| 0 | 15 | 13 |
| 1 | 13 | 15 |
| 2 | 11 | 9 |
| 3 | 9 | 11 |
| 4 | 7 | 5 |
| 5 | 5 | 7 |
| 6 | 3 | 1 |
| 7 | 1 | 3 |
| 8 | 0 | 0 |
| 9 | 2 | 4 |
| 10 | 4 | 2 |
| 11 | 6 | 8 |
| 12 | 8 | 6 |
| 13 | 10 | 12 |
| 14 | 12 | 10 |
| 15 | 14 | 16 |
| 16 | 16 | 14 |

The fill order of cell 200 appears to be unimportant as long as the spot printed has no perceptible gaps at every tint or gray scale level. Such perception would depend significantly on the printer characteristics, which dictate the best fill order.

Since preferred cell 200 is only one pixel wide, a halftone pattern geometry formed with cell 200 resolves high frequency detail and on high resolution input images has a smaller distorting effect than that which is characteristic of prior art cell geometries. A multi-pixel wide cell with a dominant length dimension is also possible. Applicant has achieved satisfactory image quality with a two-pixel wide cell. The length of (i.e., the number "N" of pixels in) the 1×N cell is constrained by the emergence of low frequency artifacts in the printed image. Skilled persons will appreciate that long, spatially asymmetric shapes other than the linear cell 200 described can be used to practice the invention. Moreover, cell 200 can be rotated by 90° for horizontal spot growth.

Halftoning has traditionally been achieved by a rectangular grid of cells. In the embodiment described below, the cells are arranged not on a rectangular grid but in a pattern approximating a hexagonal grid angularly displaced from horizontal. This geometry minimizes perceived patterning by taking into account the sensitivity of the human visual system to vertically and horizontally aligned artifacts and distributing row/column artifacts along three axes of symmetry instead of two.

Figure 8:
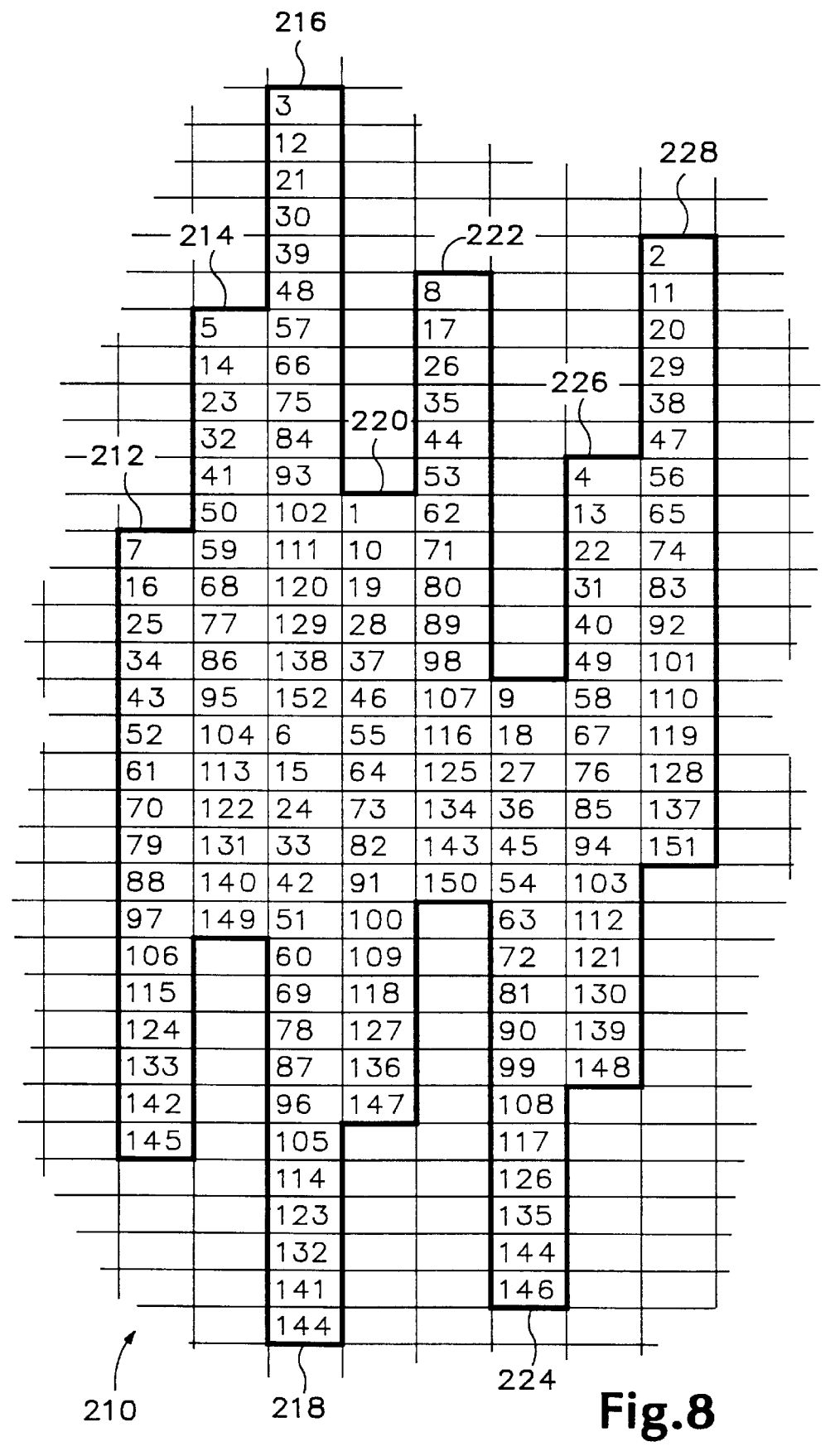

To increase the number of perceivable gray scale levels, a group of cells 200 is assembled in a super-cell structure. FIG. 8 shows a hexagonal super-cell 210 comprised of nine halftone cells of the type shown in FIG. 7, seven of which have both of their terminal pixels left free to contact the terminal pixels of other super-cell structures 210 in a tessellation pattern and two of which have an end-to-end terminal pixel contacting relationship.

With reference to FIG. 8, cells 212, 216, 218, 222, 224, and 228 are positioned side-by-side and are staggered lengthwise so that six pixels located at an end of each of the cells are open and available to contact pixels of another super-cell structure to form an interdigitated tessellation pattern, which is described below with reference to FIG. 9. Cells 214 and 220 each have one six-pixel long side and cell 226 has two six-pixel long sides available for contacting a cell of another super-cell structure 210. The placement of cells 216 and 218 in an end-on-end relation facilitates this geometry and defines the maximum length of super-cell structure 210. The preferred super-cell structure 210 has, therefore, a majority of the halftone cells arranged so that their lengths are positioned adjacent one another and so that there is no side-by-side spatial relationship between corresponding terminal pixels of adjacent cells.

In FIG. 8, each of the pixels is numbered from 0 to 152 to represent the visitation order defined by the repetition of a sequence of darkening pixels in super-cell structure 210. The preferred darkening order sequence entails darkening a pixel in each of the cells of super-cell structure 210 before darkening another pixel in a cell prior to completion of the sequence. Thus, each cell is within one gray scale level of every other cell in super-cell structure 210. The visitation order results in spatially asymmetric spot growth in each of the nine cells, as was described above with reference to FIG. 7. The visitation order of super-cell 210 permits, therefore, halftoning among halftone cells to achieve the desired number of tint or gray scale levels.

The embodiment uses a super-cell tile structure of the form $$\begin{matrix} & 3 & \\ 5 & 8 & 2 \\ 7 & 1 & 4 \\ & 6 & 9 \end{matrix}$$

in which the numbers indicate the darkening order sequence for the nine cells in the super-cell structure. Because this pattern is a recursive tessellation, artifacts are split across multiple frequencies and are not limited to the frequency of super-cell replication that characterizes clustered-dot ordered dither patterns. The nine level super-cell pattern built on a 17 pixel-based cell provides 9×17+1=154 tint or gray scale levels.

Skilled persons will appreciate that a super-cell structure may include different numbers of cells and cells having different numbers of pixels from those described for super-cell structure 210. For example, the image depicted by FIG. 11 below has 27 cells per super-cell structure and 8 pixels per cell.

Figure 9:
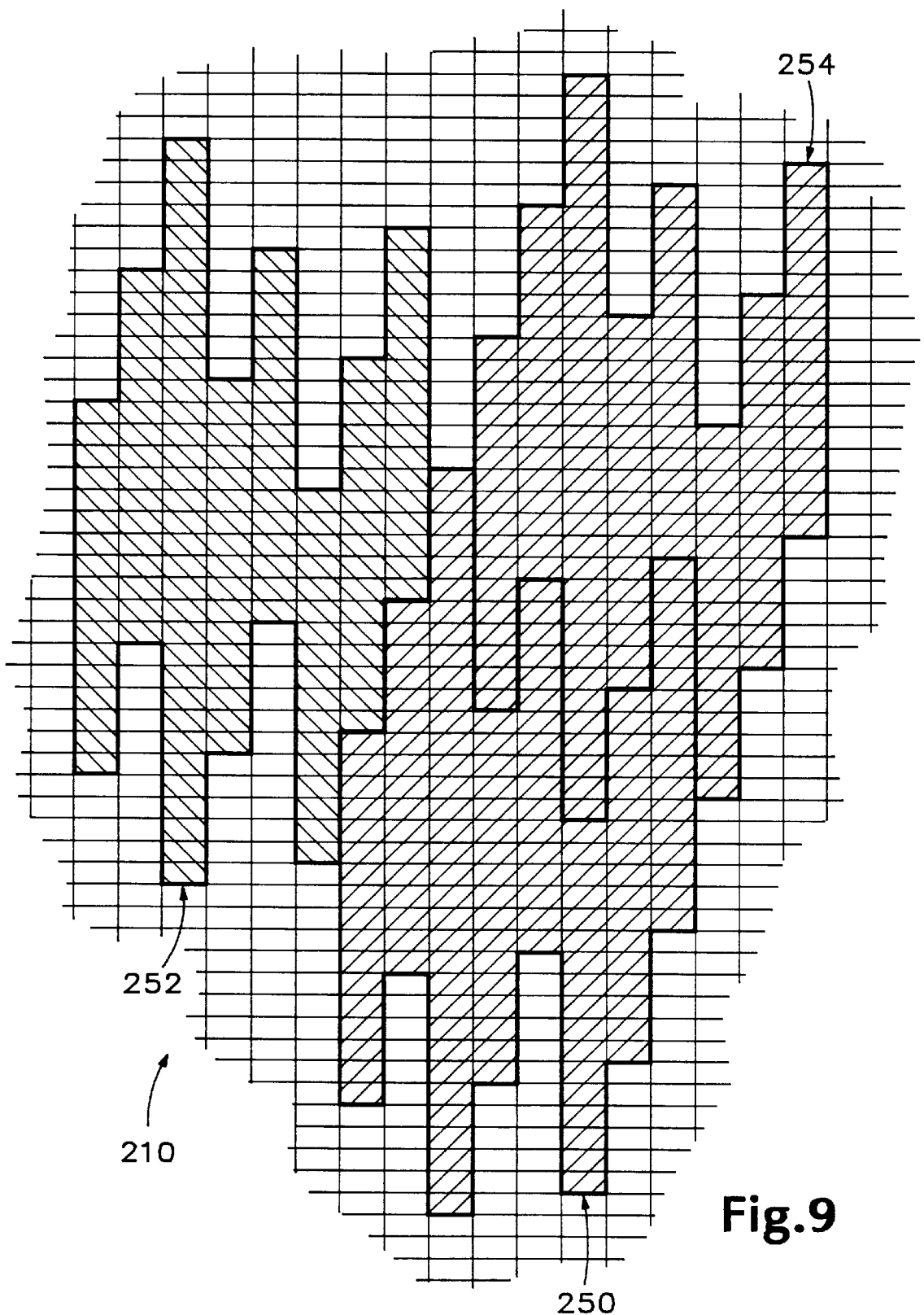
FIG. 9 shows the relative positioning of three super-cell structures of FIG. 7 to define a preferred super-cell inter-digitated tessellation geometry.

FIG. 9 shows the relative positioning of three super-cell structures 210 that define an interdigitated super-cell tessellation geometry that is replicated to tile the plane.

With reference to FIG. 9, super-cell structures 250, 252, and 254 each have opposed super-cell extreme boundaries, each of which is defined by the length of a halftone cell. The super-cell structures are tessellated to form a super-cell pattern characterized in that only one halftone cell of super-cell structure 250 is positioned between one of the boundaries of super-cell structure 252 and one of the boundaries of super-cell structure 254. Each of the halftone cells in super-cell structures 250, 252, and 254 includes first and second terminal pixels. Super-cell structures 250, 252, and 254 are tessellated to form a super-cell pattern characterized by the first and second terminal pixels of the halftone cells of super-cell structure 252 being positioned adjacent none of the first and second terminal pixels of the halftone cells of super-cell structure 254, and by different first terminal pixels of the halftone cells of super-cell structure 250 being positioned adjacent at least two second terminal pixels of the halftone cells of each of super-cell structures 252 and 254.

Figure 10:
FIG. 10 shows an image halftoned using the screen corresponding to the tessellation geometry of FIG. 9.
Figure 11:
FIG. 11 shows an alternative embodiment of the invention.

FIG. 10 represents an image halftoned using the screen corresponding to the tessellation geometry of FIG. 9. FIG. 10 is formed on a 300×600 dpi (12×24 dpm) grid using the 1×17 pixel cell 200 of FIG. 7 and 9-cell super-cell structure 210 of FIG. 8. FIG. 11 shows a variation of the invention formed on a 300×300 dpi (12×12 dpm) grid using a 1×8 pixel linear cell and a 27-cell super-cell structure.

Figure 1:
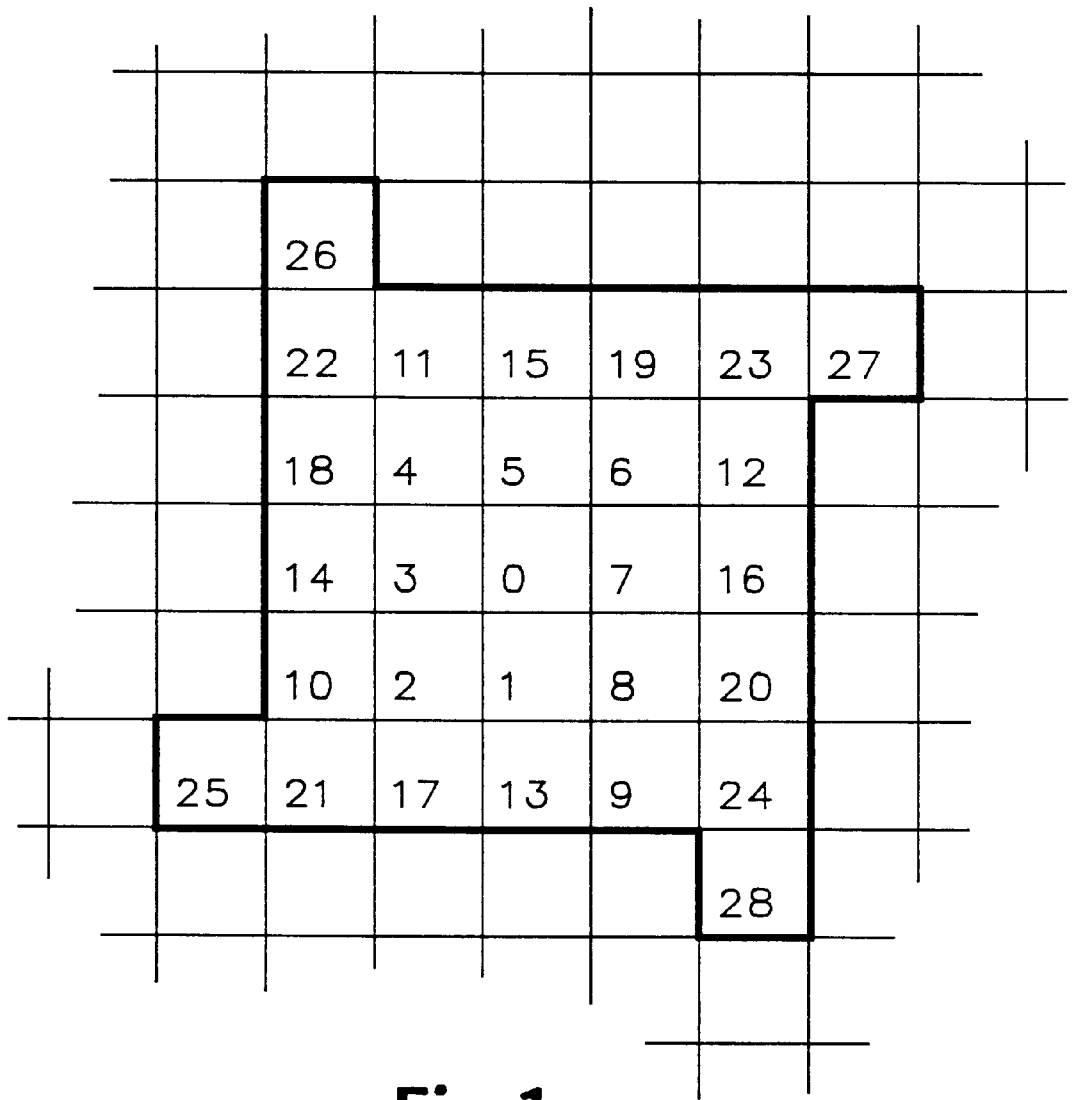
FIG. 1 shows a prior art halftone cell grouping of twenty-nine pixels.
Figure 2:
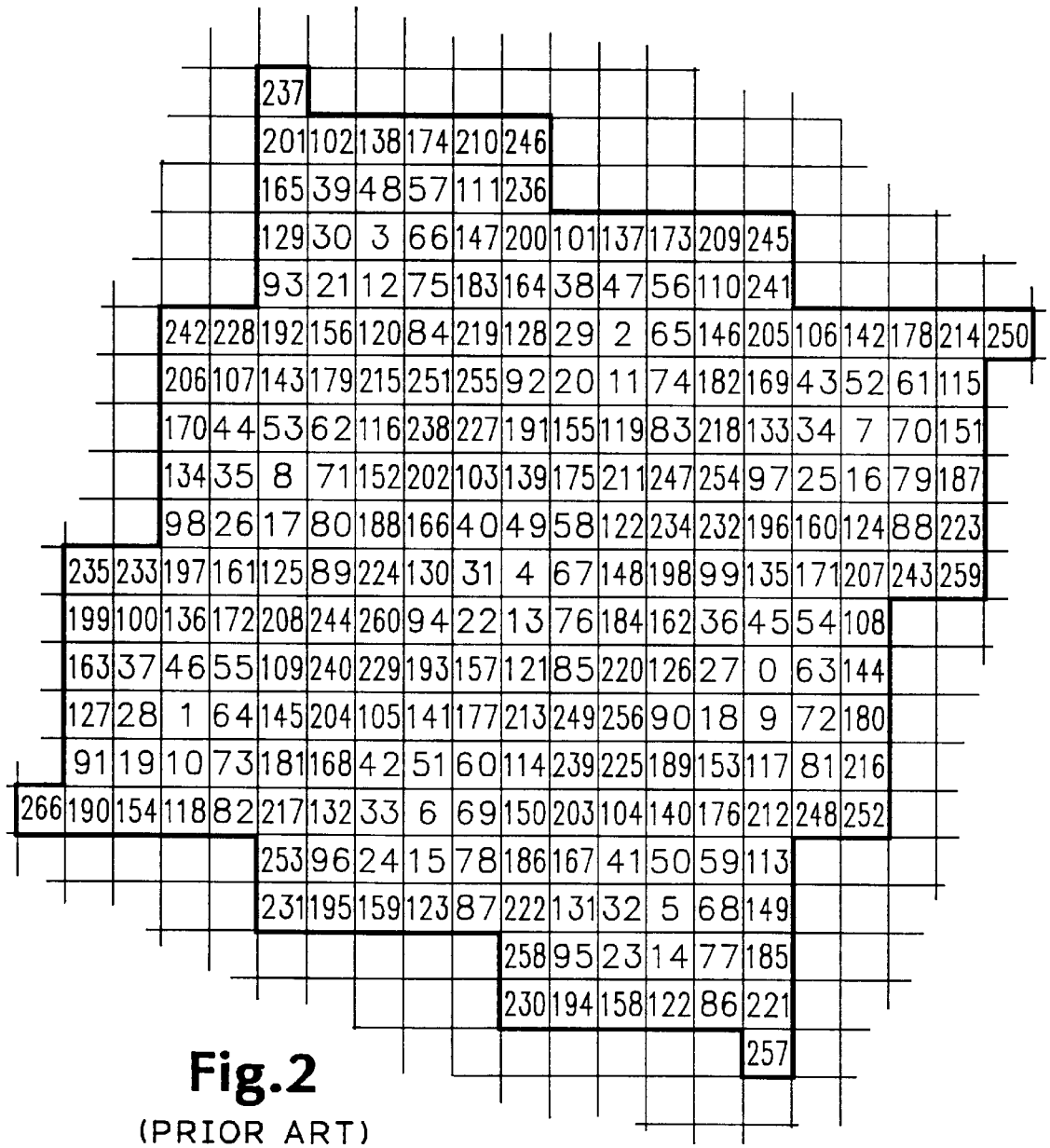
FIG. 2 shows a prior art super-cell structure and spot growth visitation order for an array of nine halftone cells of the type shown in FIG. 1.
Figure 3:
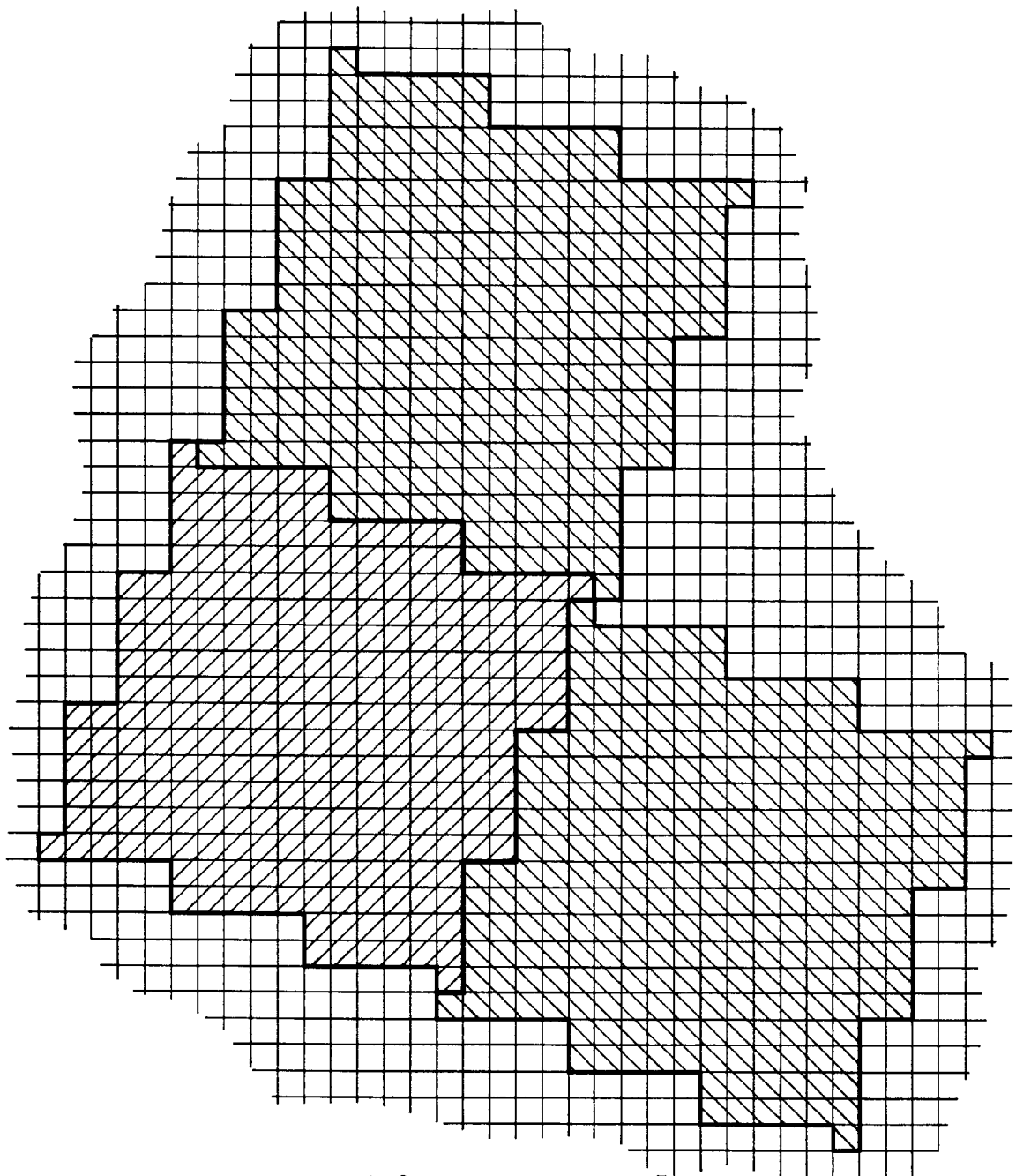
FIG. 3 shows the relative positioning of three super-cell structure of FIG. 2 to define a prior art super-cell tessellation geometry.
Figure 4:
FIG. 4 shows an image halftoned using the screen corresponding to the tessellation geometry of FIG. 3.

Comparison of FIGS. 10 and 11 of the invention with FIG. 4 of the prior art reveals that the latter presents an image having spots with a variety of complex edge structures that when printed at full printer resolution can induce inconsistent darkening behavior. This results from the printer's depositing different amounts of wax or colorant for nominally the same gray scale level. The spot sizes of the FIG. 4 image appear more coarse than those of the FIGS. 10 and 11 images because of the center-weighted spot growth pattern characterizing the prior art method.

There is a very distinct artifact at the frequency of the halftone cell used to form the image of FIG. 4 that is most evident in areas of uniform darkness. This is much less pronounced in the images formed by the halftone cells of FIGS. 10 and 11. This effect is noticeable by comparing, for example, the patterning of the forehead of the child pictured in FIG. 4 with that pictured in FIGS. 10 and 11.

Since the artifacts are distributed over three axes instead of two for images formed in accordance with the invention, rows of spots are more evident in the image of FIG. 4 as compared with the images of FIGS. 10 and 11. FIGS. 10 and 11 exhibit better edge definition by preserving more high frequency detail than that shown in FIG. 4. This effect is noticeable by comparing, for example, the resolution of the lips of the child pictured in FIG. 4 with that pictured in FIGS. 10 and 11.

It will be obvious to those having skill in the art that many changes may be made to the details of the above-described embodiments of this invention without departing from the underlying principles thereof. Accordingly, it will be appreciated that this invention is also applicable to selectable media printing applications other than those found in the field of PostScript®-controlled thermal transfer printing. The scope of the present invention should, therefore, be determined only by the following claims.

I claim:

1. A method of creating a halftone pattern geometry using multiple halftone cells to synthesize a printer image with minimal low frequency artifacts, comprising:

developing halftone cells having initially darkened pixels at predetermined positions, each cell being a single pixel wide having multiple pixels arranged to form a spatially asymmetric spot growth area having a dominant length dimension;

arranging the halftone cells relative to one another in a group which approximates a hexagonal grid angularly displaced from the horizontal so that the initially darkened pixels of the halftone cells in the group form a diffuse pattern, the diffuse pattern minimizing the development of low frequency artifacts providing a dispersed dot ordered dither that distributes row and column artifacts along 3 axes of symmetry to minimize perceived patterning; and darkening the pixels of the halftone cells in the group in a sequence that disperses darkened pixels among different ones of the halftone cells as they are progressively darkened to achieve spot growth generally along the length dimension of each cell thereby to achieve a perceived monotonic darkening of the cell via a nested dot growth pattern that is spatially asymmetric.

2. The method of claim 1 in which each of the halftone cells includes first and second terminal pixels and in which the darkening of the cell is accomplished by initially darkening the first terminal pixel and then progressively darkening pixels from the first terminal pixel to the second terminal pixel.

3. The method of claim 1 in which each of the halftone cells includes first and second terminal pixels and in which, for each of the halftone cells, the darkening of the cell begins at a medial pixel positioned medially of the first and second terminal pixels of the halftone cell and progresses outwardly from the medial pixel toward the first and second terminal pixels.

4. The method of claim 1 in which multiple ones of the halftone cell in the group are assembled in a super-cell structure to increase the number of perceivable gray levels, the super-cell structure characterized in that a majority of the halftone cells are arranged so that their lengths are positioned adjacent one another.

5. The method of claim 4 in which each of the multiple ones of halftone cells in the group includes first and second terminal pixels and the super-cell structure is arranged so that there is no side-by-side spatial relationship between corresponding first and second terminal pixels of adjacent cells.

6. The method of claim 4 in which the darkening of the halftone cells in the group constituting a super-cell structure is characterized by a visitation order defined by a sequence of darkening one pixel in each of the cells of the super-cell structure before darkening another pixel in a cell prior to completion of the sequence.

7. The method of claim 6 in which darkening is accomplished by multiple repetitions of the darkening sequence.

8. The method of claim 4 in which a super-cell structure has opposed super-cell boundaries, each boundary defined by the length of a halftone cell, and in which multiple super-cell structures are tessellated to form a super-cell pattern characterized in that only one halftone cell of a first super-cell structure is positioned between one of the boundaries of a second halftone cell and one of the boundaries of a third halftone cell.

9. The method of claim 4 in which each of the halftone cells in the group in the super-cell structure includes first and second terminal pixels, and in which multiple super-cell structures are tessellated to form a super-cell pattern characterized by a positioning of first and second super-cell structures so that the first and second terminal pixels of the halftone cells of the first super-cell structure are positioned adjacent none of the first and second terminal pixels of the halftone cells of the second super-cell structure, and different first terminal pixels of the halftone cells of a third super-cell structure are positioned adjacent at least two second terminal pixels of the halftone cells of each of the first and second super-cell structures.

10. The method of claim 2 in which the terminal pixels are arranged to form a hexagonal pattern.

* * * * *